(12) United States Patent
Kawamura et al.

(10) Patent No.: US 11,550,314 B2
(45) Date of Patent: Jan. 10, 2023

(54) OPERATION PLAN CREATION DEVICE, OPERATION PLAN CREATION METHOD, AND PROGRAM

(71) Applicant: Mitsubishi Power, Ltd., Kanagawa (JP)

(72) Inventors: Naoya Kawamura, Tokyo (JP); Shun Kawachi, Tokyo (JP); Takao Kondo, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/429,785

(22) PCT Filed: Mar. 13, 2020

(86) PCT No.: PCT/JP2020/011029
§ 371 (c)(1),
(2) Date: Aug. 10, 2021

(87) PCT Pub. No.: WO2020/195926
PCT Pub. Date: Oct. 1, 2020

(65) Prior Publication Data
US 2022/0100188 A1  Mar. 31, 2022

(30) Foreign Application Priority Data

Mar. 28, 2019 (JP) .............................. JP2019-062554

(51) Int. Cl.
*G05B 23/02* (2006.01)
(52) U.S. Cl.
CPC ..... *G05B 23/0283* (2013.01); *G05B 23/0278* (2013.01)
(58) Field of Classification Search
CPC ............ G05B 23/0283; G05B 23/0297; G05B 2219/32234; G05B 2219/32235;
(Continued)

(56) References Cited

U.S. PATENT DOCUMENTS

2003/0171963 A1* 9/2003 Kurihara .......... G05B 19/41865
703/10
2015/0378338 A1   12/2015 Kawamura et al.
2020/0081428 A1   3/2020 Kawamura et al.

FOREIGN PATENT DOCUMENTS

CA         2826504 A1 *  8/2012  ......... G05B 19/0426
JP       2005-240776        9/2005
(Continued)

OTHER PUBLICATIONS

International Search Report dated Jun. 16, 2020 in International Application No. PCT/JP2020/011029 with English translation.
(Continued)

*Primary Examiner* — Son T Le
*Assistant Examiner* — Matthew W. Baca
(74) *Attorney, Agent, or Firm* — Wenderoth, Lind & Ponack, L.L.P.

(57) ABSTRACT

An operation plan creation device includes: an operation information creation unit configured to receive an input of a simple setting including information with which an operation period of a device is identifiable and to create operation information including an inspection period and a replacement scheduled component in the operation period of the device; a component information acquisition unit configured to acquire component information including lifespan information and stock quantity information about each of the components, based on use history information about each of the plurality of components; a dummy information creation unit configured to create, when the acquired component information includes missing information, dummy information to be used instead of the missing information; and a plan creation unit configured to create the operation plan for the components related to the device based on the operation (Continued)

information and the component information or the dummy information.

8 Claims, 20 Drawing Sheets

(58) Field of Classification Search
CPC .......... G06Q 10/06375; G06Q 10/103; G06Q 10/06; G06Q 10/063; Y02P 90/02
See application file for complete search history.

(56) References Cited

FOREIGN PATENT DOCUMENTS

| | | |
|---|---|---|
| JP | 2014-170376 | 9/2014 |
| JP | 2015-121855 | 7/2015 |
| WO | 2018/168773 | 9/2018 |

OTHER PUBLICATIONS

Written Opinion of the International Searching Authority dated Jun. 16, 2020 in International Application No. PCT/JP2020/011029 with English translation.

* cited by examiner

GROUP SETTING SCREEN

REGISTER ADDITIONAL GROUP

REGION NAME [▼]  COUNTRY NAME [▼]  CUSTOMER NAME [▼]  [SEARCH] — B20

MACHINE NAME [▼]  MODEL [▼]

| REGION ▼ | COUNTRY | CUSTOMER NAME | MACHINE NAME | MACHINE CODE | MODEL |
|---|---|---|---|---|---|
| ▼ R01 | N11 | CS01 | MACHINE 01 | PL01 | TY01 |
| ▼ R01 | N11 | CS01 | MACHINE 02 | PL01 | TY01 |

[ADDITION] — B21

GROUP REGISTERED TARGET LIST

REGION NAME [▼]  COUNTRY NAME [▼]  CUSTOMER NAME [▼]  MACHINE NAME ▼  [SEARCH] — B22

MACHINE NAME [▼]

| REGISTRATION NUMBER ▼ | REGION ▼ | COUNTRY ▼ | CUSTOMER NAME ▼ | MACHINE NAME ▼ |
|---|---|---|---|---|
| 1 | R02 | N21 | CS08 | MACHINE 08 |
| 2 | R01 | N11 | CS01 | MACHINE 01 |
|   | R01 | N11 | CS01 | MACHINE 02 |

SCENARIO SETTING

| APPLY EXISTING SCENARIO | NO SCENARIO |
|---|---|
| ○ [SELECT SCENARIO] | ● |
| ● [SELECT SCENARIO] 2018-00044 | ○ |

— B23

[SAVE] — B24   [CANCEL]

FIG. 6

| SIMPLE SETTING SCREEN | D3 |
|---|---|
| PERIODIC INSPECTION PATTERN | PATTERN 1▼ |
| OPERATION START DATE | 2016/11/01 |
| PERIODIC INSPECTION INTERVAL | 12,000 |
| NUMBER OF DAYS CONSUMED PER OPERATION | 500 |
| PERIODIC INSPECTION COUNT | 30 |

FIG. 7

<PERIODIC INSPECTION PATTERN INFORMATION>

| INSPECTION TYPE | REPLACEMENT COMPONENT TYPE | PERIOD (NUMBER OF DAYS) |
|---|---|---|
| C | A01, B01 | 12 |
| T | A01, B01, C01 | 22 |
| M | A01, B01, C01, D01 | 32 |
| ⋮ | ⋮ | ⋮ |

| PATTERN NUMBER | PERIODIC INSPECTION PATTERN |
|---|---|
| 1 | CTCM |
| 2 | TTM |
| ⋮ | ⋮ |

FIG. 8

OPERATION INFORMATION DISPLAY SCREEN

OPERATION INFORMATION

| ID  | TYPE      | START POINT | END POINT  | INSTALLATION WORK | REMOVAL WORK | COMPONENT REPLACED DURING INSTALLATION |
|-----|-----------|-------------|------------|-------------------|--------------|----------------------------------------|
| 000 | OPERATION | 2016/11/01  | 2018/05/31 | —                 | C            | A01, B01                               |
| 001 | OPERATION | 2018/06/12  | 2019/11/30 | C                 | T            | A01, B01, C01                          |
| 002 | OPERATION | 2019/12/22  | 2021/05/31 | T                 | C            | A01, B01                               |
| 003 | OPERATION | 2021/06/12  | 2022/11/30 | C                 | M            | A01, B01, C01, D01                     |
| 004 | OPERATION | 2023/01/01  | 2024/05/31 | M                 | C            | A01, B01                               |
| ... | ...       | ...         | ...        | ...               | ...          | ...                                    |

[B40] SIMPLE SETTING  [B41] COMPONENT REPLACED DURING INSTALLATION  [B42] LOCAL STOCK  [B43] LIFESPAN INFORMATION  [B44] ADD ROW  [B45] DELETE ROW  [B46] SAVE  CLOSE

FIG. 9

| MASTER LIFESPAN (LIFESPAN MASTER) | |
|---|---|
| COMPONENT CODE | DESIGN LIFE |
| AAA001 | 37, 500 |
| AAA002 | 37, 500 |
| BBB001 | 37, 500 |
| ⋮ | ⋮ |

| USE HISTORY INFORMATION (MACHINE: PL01) | | | |
|---|---|---|---|
| COMPONENT TYPE | COMPONENT CODE | CONSUMPTION TIME | QUANTITY |
| A01 | AAA01 | 1,235 | 20 |
| B01 | BBB01 | 1,235 | 20 |
| C01 | CCC01 | 1,235 | 20 |
| D01 | DDD01 | 1,235 | 20 |
| E01 | EEE01 | 1,235 | 20 |
| ⋮ | ⋮ | ⋮ | ⋮ |

FIG. 11

SIMPLE OPERATION PLAN (COLLECTIVE CALCULATION RESULT) T4

| REGISTRATION NUMBER | REGION | COUNTRY | CUSTOMER NAME | MACHINE NAME | MODEL | SCENARIO INFORMATION | CATEGORY | COMPONENT CODE | 2018/04 | 2018/05 | 2018/06 |
|---|---|---|---|---|---|---|---|---|---|---|---|
| 1 | R02 | N21 | CS08 | MACHINE 08 | TY01 | - | NEW | AAA01 |  | 12 |  |
|  |  |  |  |  |  |  |  | AAA02 |  | 2 |  |
|  |  |  |  |  |  |  | REPAIRED | AAA01 |  | 12 |  |
|  |  |  |  |  |  |  |  | AAA02 |  | 2 |  |
| 2 | R01 | N11 | CS01 | MACHINE 01 | TY01 | 2018-00044 | NEW | AAA01 | 12 |  |  |
|  |  |  |  |  |  |  |  | AAA02 | 2 |  |  |
|  |  |  |  |  |  |  | REPAIRED | AAA01 | 12 |  |  |
|  |  |  |  |  |  |  |  | AAA02 | 2 |  |  |
|  | R01 | N11 | CS01 | MACHINE 02 | TY01 | 2018-00044 | NEW | AAA01 |  |  | 12 |
|  |  |  |  |  |  |  |  | AAA02 |  |  | 2 |
|  |  |  |  |  |  |  | REPAIRED | AAA01 |  |  | 12 |

FIG. 12

| | A | B | C | D | E | F | G | H |
|---|---|---|---|---|---|---|---|---|
| 1 | MENU | | | | | | | |
| 2 | | | | | | | | |
| 3 | | | | | CREATE | | | |
| 4 | | | | | P/R TABLE | | | |
| 5 | | | | | | | | |
| 6 | | | | | | | | |
| 7 | | | | | | | | |
| 8 | | | | | | | | |
| 9 | MACHINE BASIC INFORMATION SETTING | | | | | | | |
| 10 | NUMBER OF DEVICES | 4 | | | | | | |
| 11 | NUMBER OF PLAN YEARS | 13 | | | | | | |
| 12 | MACHINE NAME | PL01 | | | | | | |
| 13 | MODEL | *** | | | | | | |
| 14 | DELIVERED COMPONENT | *** | | | | | | |
| 15 | | COM | TP | M.N | P.N | TS1 | TS2 | TS3 |
| 16 | | | | | | | | |

FIG. 13

| SHEET NAME | ITEM | MANDATORY | INPUT FORMAT | INPUT EXAMPLE | EXPLANATION |
|---|---|---|---|---|---|
| config | NUMBER OF DEVICES | O | PULL DOWN | 4 | NUMBER OF UNITS OF DEVICES IN CORRESPONDING MACHINE |
| | NUMBER OF PLAN YEARS | O | INPUT | 13 | NUMBER OF YEARS FOR WHICH PARTS ROTATION IS TO BE CALCULATED |
| | MACHINE NAME | O | INPUT | PL01 | MACHINE NAME |
| | MODEL | O | INPUT | | MODEL |
| | DELIVERED COMPONENT | O | INPUT | A01 | COMPONENTS FOR WHICH PARTS ROTATION IS CONSIDERED. ENTER HORIZONTALLY. |
| | OPERATION START YEAR | O | INPUT | 2010 | OPERATION START YEAR (ENTER STARTING YEAR WHEN PARTS ROTATION IS TO BE DRAWN FROM MIDWAY NOT FROM OPERATION START) |
| | OPERATION START MONTH | O | INPUT | 10 | OPERATION START MONTH (ENTER STARTING MONTH WHEN PARTS ROTATION IS TO BE DRAWN FROM MIDWAY NOT FROM OPERATION START) |
| | PERIODIC INSPECTION INTERVAL | O | INPUT | 18000 | TIME INTERVAL BETWEEN PERIODIC INSPECTIONS. FOR EACH DEVICE. TOGETHER WITH START MONTH/YEAR WHEN REVISING. |
| | COMPONENT LIFESPAN | O | INPUT | | COMPONENT LIFESPAN. FOR EACH DEVICE. TOGETHER WITH START DAY/MONTH/YEAR WHEN REVISING. |
| | REPLACEMENT PATTERN | O | INPUT | 1 | SET NUMBER OF INTERVALS IN WHICH REPLACEMENT IS PERFORMED. 1 = REPLACEMENT IN ONE INTERVAL, 2 = REPLACEMENT IN TWO INTERVALS |
| Parts_Master | DELIVERED COMPONENT NAME | O | INPUT | A01 | COMPONENTS FOR WHICH PARTS ROTATION IS CONSIDERED. |
| | DELIVERED COMPONENT ID | O | INPUT | A01 | SAME AS ABOVE. (REQUIRED FOR CALCULATION) |
| | CONSTITUENT COMPONENT | O | INPUT | AAA01 | IN THE CASE IN WHICH ONE COMPONENT IS CONFIGURED OF A PLURALITY OF COMPONENTS, ENTER ONLY THE NUMBER THEREOF. |
| | NUMBER OF CONSTITUENT COMPONENTS | O | INPUT | 16 | CONSTITUENT COMPONENT QUANTITY. |

| COMPONENT CODE | STOCK QUANTITY |
|---|---|
| AAA01 | 20 |
| AAA02 | 15 |
| BBB01 | 2 |
| ⋮ | ⋮ |

LOCAL STOCK CHANGE SCREEN — D8

UPDATE (B80) | CLOSE

FIG. 18

LIFESPAN SETTING SCREEN — D9

| COMPONENT CODE | DESIGN LIFE | LIFESPAN AFTER CHANGE | APPLICATION START | APPLICATION END |
|---|---|---|---|---|
| AAA01 | 37,500 | 37,500 | 2012▼ | 2018▼ |
| AAA02 | 37,500 | 50,000 | 2018▼ | 2024▼ |
| BBB01 | 37,500 | 37,500 | 2012▼ | 2018▼ |
| ⋮ | ⋮ | ⋮ | ⋮ | ⋮ |

UPDATE — B90    CLOSE

FIG. 19

OPERATION PLAN CREATION DEVICE, OPERATION PLAN CREATION METHOD, AND PROGRAM

TECHNICAL FIELD

The present invention relates to an operation plan creation device, an operation plan creation method, and a program. This application claims priority based on JP 2019-062554 filed in Japan on Mar. 28, 2019, of which the contents are incorporated herein by reference.

BACKGROUND ART

Various components are used in a machine. The lifespan differs among such components. Thus, the components are managed by what is known as rotation (parts rotation), which is a scheme in which a periodic inspection is repeated until the lifespan expires and the components are replaced with a spare component or a repaired component depending on the consumed state. Such components include expensive and essential components, and thus it is important for a user managing a machine to create a rotation plan enabling an operation at a low cost. For example, Patent Document 1 describes an operation plan creation device that can improve the accuracy of the rotation plan by taking into account the compatibility of components.

CITATION LIST

Patent Literature

Patent Document 1: WO 2018/168773

SUMMARY OF INVENTION

Technical Problem

With the known technique, the user is required to create the rotation plan by individually inputting a condition setting for each of a plurality of machines. Thus, a huge amount of time and labor is required for creating the rotation plans for all the machines, meaning that the timely creation of the operation plan has been difficult. As a result, demand of high-temperature components cannot be accurately predicted, and thus there is a risk that the stock quantity will be too low or too high.

The present invention provides an operation plan creation device, an operation plan creation method, and a program capable of easily and quickly creating an operation plan for a component.

Solution to Problem

An operation plan creation device according to a first aspect of the present invention is configured to create an operation plan for a plurality of components mounted to a device, and includes: a simple setting acquisition unit configured to acquire a simple setting including number of inspections on the device, information with which an inspection interval is identifiable, and an inspection pattern with which a component to be replaced in an inspection is defined in advance; an operation information creation unit configured to create operation information including an inspection period and a replacement scheduled component of the device based on the acquired simple setting; a component information acquisition unit configured to acquire component information including lifespan information and stock quantity information about each of the plurality of components currently used in or to be used in the device, based on use history information about each of the plurality of components; a dummy information creation unit configured to create, when the acquired component information includes missing information, dummy information to be used instead of the missing information; and a plan creation unit configured to create the operation plan for the components related to the device based on the operation information and the component information or the dummy information.

With the known technique, the user is required go through an extremely labor and time consuming process of inputting a large number of condition settings, information, and the like unique to the device in advance, to create an operation plan for a component. Furthermore, the operation plan cannot be created if a part of the condition settings and the information is missing. On the other hand, with the operation plan creation device according to the above-described aspect, the operation information about the device can be created by inputting the simple setting only, and when the component information is missing, the operation plan can be created with the dummy information compensating for the missing information. Thus, the user can easily and swiftly create the operation plan for a component by only performing a simple operation.

According to a second aspect of the present invention, the operation plan creation device according to the first aspect further includes a scenario information creation unit configured to create scenario information including changed operation information and component information upon receiving a change in the operation information and the component information related to one of a plurality of the devices. The plan creation unit creates the operation plan based on the operation information and the component information included in the scenario information for the one device.

With such a configuration, the operation plan creation device can create a more accurate operation plan by using scenario information including the operation information and the component information changed in accordance with an operation state (installation environment, continuous operation time, and the like) of the device.

According to a third aspect of the present invention, in the operation plan creation device according to the second aspect, the scenario information creation unit determines whether to apply the scenario information for each of the plurality of devices, and for a device to which the scenario information is determined to be applied, the plan creation unit creates the operation plan based on the operation information and the component information included in the scenario information.

With such a configuration, for example, the operation plan creation device can apply the same scenario information to a plurality of devices under similar operation states, to create the operation plan. Thus, the operation plan creation device can create a highly accurate operation plan for a device to which the scenario information is applied, while reducing a labor for individually creating the scenario information for each of the plurality of devices.

According to a fourth aspect of the present invention, in the operation plan creation device according to the second or the third aspect, the scenario information creation unit receives a change to add or delete the inspection period and the replacement scheduled component.

With such a configuration, the operation plan creation device can increase or reduce the number of periodic inspections and the replacement scheduled components, depending on the operation state and the like of the device. Thus, the operation plan creation device can create a more accurate operation plan.

According to a fifth aspect of the present invention, in the operation plan creation device according to any one of the second to the fourth aspects, the scenario information creation unit receives a change in the inspection pattern defined in advance.

With such a configuration, the operation plan creation device can change the inspection pattern, depending on the operation state and the like of the device. Thus, the operation plan creation device can create a more accurate operation plan.

According to a sixth aspect of the present invention, in the operation plan creation device according to any one of the first to the fifth aspects, the dummy information creation unit creates dummy information about the lifespan information based on a design life of each of the plurality of components.

With this configuration, the operation plan creation device can reduce the labor of the user for inputting the lifespan information about the component.

An operation plan creation method according to a seventh aspect of the present invention is a method of creating an operation plan for a plurality of components mounted to a device, the method including: acquiring a simple setting including number of inspections on the device, information with which an inspection interval is identifiable, and an inspection pattern with which a component to be replaced in an inspection is defined in advance; creating operation information including an inspection period and a replacement scheduled component of the device based on the acquired simple setting; acquiring component information including lifespan information and stock quantity information about each of the plurality of components currently used in or to be used in the device, based on use history information about each of the plurality of components; creating, when the acquired component information includes missing information, dummy information to be used instead of the missing information; and creating the operation plan for the components related to the device based on the operation information, the component information, and the dummy information.

A program according to an eighth aspect of the present invention is a program making a computer of an operation plan creation device configured to create an operation plan for a plurality of components mounted to a device function, the program causing the computer to execute: acquiring a simple setting including number of inspections on the device, information with which an inspection interval is identifiable, and an inspection pattern with which a component to be replaced in an inspection is defined in advance; creating operation information including an inspection period and a replacement scheduled component of the device based on the acquired simple setting; acquiring component information including lifespan information and stock quantity information about each of the plurality of components currently used in or to be used in the device, based on use history information about each of the plurality of components; creating, when the acquired component information includes missing information, dummy information to be used instead of the missing information; and creating the operation plan for the components related to the device based on the operation information, the component information, and the dummy information.

Advantageous Effects of Invention

With the operation plan creation device, the operation plan creation method, and the program according to the present invention, an operation plan for a component can be easily and swiftly created.

BRIEF DESCRIPTION OF DRAWINGS

FIG. 6 is a diagram illustrating a function of a group creation unit according to one embodiment of the present invention.

FIG. 7 is a diagram illustrating a function of a simple setting acquisition unit according to one embodiment of the present invention.

FIG. 8 is a diagram illustrating an example of a periodic inspection pattern according to one embodiment of the present invention.

FIG. 9 is a diagram illustrating a function of an operation information creation unit according to one embodiment of the present invention.

FIG. 10 is a schematic diagram illustrating an example of master information according to one embodiment of the present invention.

FIG. 11 is a schematic diagram illustrating an example of use history information according to one embodiment of the present invention.

FIG. 12 is a diagram illustrating an example of a simple operation plan according to one embodiment of the present invention.

FIG. 13 is a diagram illustrating a function of a detailed setting acquisition unit according to one embodiment of the present invention.

FIG. 14 is a diagram illustrating an example of detailed setting according to one embodiment of the present invention.

FIG. 15 is a diagram illustrating an example of a detailed operation plan according to one embodiment of the present invention.

FIG. 18 is a second diagram illustrating a function of a scenario information creation unit according to one embodiment of the present invention.

FIG. 19 is a third diagram illustrating a function of a scenario information creation unit according to one embodiment of the present invention.

DESCRIPTION OF EMBODIMENTS

An operation plan creation system 1 and an operation plan creation device 10 according to one embodiment of the present invention will be described below with reference to the drawings.

(Configuration of Operation Plan Creation System)

Figure 1:
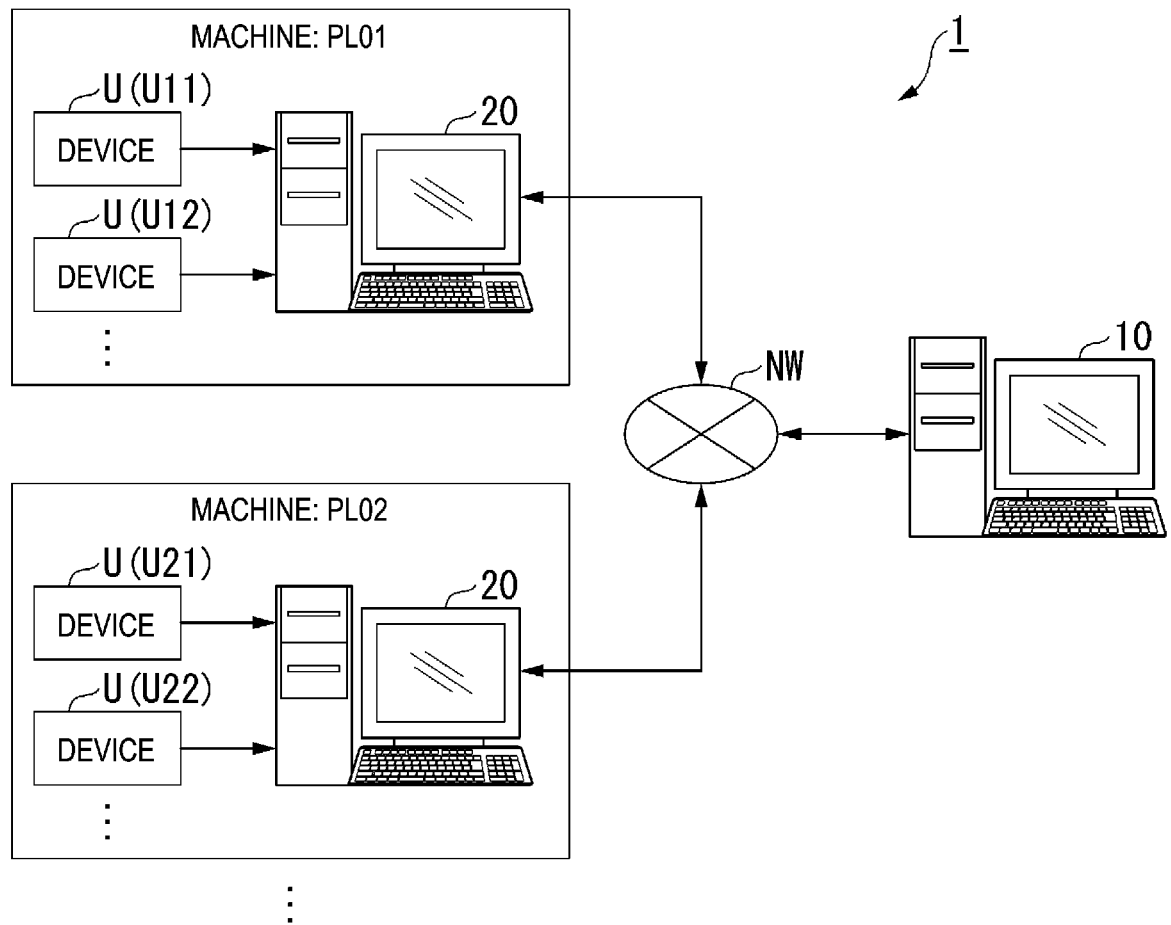
FIG. 1 is a diagram illustrating an overview of an operation plan creation system according to one embodiment of the present invention.

FIG. 1 is a diagram illustrating an overview of an operation plan creation system according to one embodiment of the present invention.

As illustrated in FIG. 1, the operation plan creation system 1 according to the present embodiment includes the operation plan creation device 10 that creates an operation plan for components mounted to a device operating in a machine, facility, or the like. Furthermore, the component may be an assembly formed of a plurality of components. The operation plan for components is a plan for replacement (also known as rotation) of the component used with a spare component, repaired component, or new component. The rotation may be carried out with a spare component or a repaired component prepared in advance for a certain device, and may be carried out with a spare component or a repaired component prepared in advance for different devices of the same model. Furthermore, when the number of the spare components and repaired components is insufficient, a new component may be purchased to be used for replacement.

As illustrated in FIG. 1, the operation plan creation device 10 according to the present embodiment creates an operation plan for each of a plurality of devices U (U11, U12, ..., U21, U22, ...) that operate in a plurality of machines PL01, PL02, .... FIG. 1 illustrates an example where the operation plan creation device 10 include a single computer, but this should not be construed in a limiting sense. The operation plan creation device 10 may include a plurality of computers such as server terminal devices.

The operation plan creation system 1 may further include an individual component information management system 20 that records the lifespan, use history, stock quantity, and the like of each of the plurality of components being used or to be used in each of the machines PL01, PL02, .... The operation plan creation device 10 and the individual component information management system 20 are communicatively connected to each other via a network NW, so that the operation plan creation device 10 can use information about components for each machine, accumulated in the individual component information management system 20.

(Functional Configuration of Operation Plan Creation Device)

Figure 2:
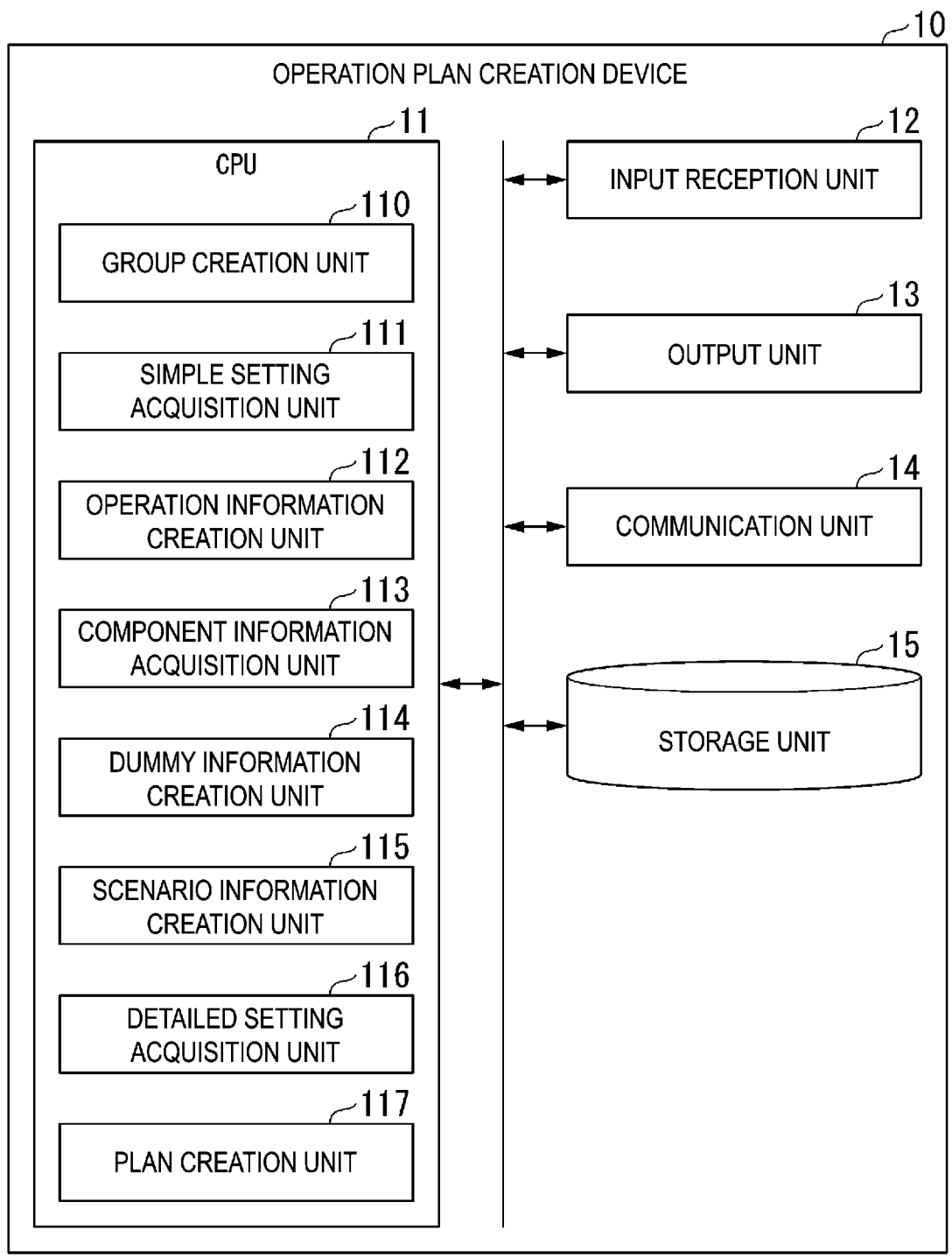
FIG. 2 is a diagram illustrating a functional configuration of the operation plan creation device according to one embodiment of the present invention.

FIG. 2 is a diagram illustrating a functional configuration of the operation plan creation device according to one embodiment of the present invention.

As illustrated in FIG. 2, the operation plan creation device 10 includes a CPU 11, an input reception unit 12, an output unit 13, a communication unit 14, and a storage unit 15.

The CPU 11 is a processor that is responsible for the entire operation of the operation plan creation device 10, and is configured to operate in accordance with a predetermined program to provide functions of a group creation unit 110, a simple setting acquisition unit 111, an operation information creation unit 112, a component information acquisition unit 113, a dummy information creation unit 114, a scenario information creation unit 115, a detailed setting acquisition unit 116, and a plan creation unit 117.

The group creation unit 110 creates a group including at least one machine. The operation plan creation device 10 according to the present embodiment is capable of collectively creating an operation plan for a plurality of devices U. For example, a user is assumed to collectively create an operation plan for a plurality of devices U provided on a machine managed by a certain customer (such as a power generation operator). In this case, the group creation unit 110 registers the machine managed by the customer designated by the user in a single group. Which machine is to be registered in one group can be set in any way by the user.

The simple setting acquisition unit 111 acquires a simple setting including information with which the number of and interval of inspections performed on the device U is identifiable and an inspection pattern in which a component to be replaced during the inspection is defined in advance.

The operation information creation unit 112 creates operation information including an inspection period and a replacement scheduled component of the device U based on the simple setting acquired by the simple setting acquisition unit 111.

The component information acquisition unit 113 acquires component information including lifespan information and stock quantity information about each of a plurality of components currently used or scheduled to be used in the device U, based on the use history information about each of the plurality of components. In the present embodiment, the component information acquisition unit 113 acquires the use history information about the components from the individual component information management system 20.

When the component information acquired by the component information acquisition unit 113 includes missing information, the dummy information creation unit 114 creates dummy information to be used instead of the missing information.

Upon receiving a change in the operation information and the component information about one of the plurality of devices U, the scenario information creation unit 115 creates scenario information including operation information and component information after the change. The scenario information creation unit 115 determines whether to apply the created scenario information for each of the plurality of devices U.

The detailed setting acquisition unit 116 acquires a detailed setting including information with which the operation information specific to the device U and the component information is identifiable.

The plan creation unit 117 creates an operation plan (hereinafter, also referred to as a "simple operation plan") of the components related to the device U based on the operation information and the component information or the dummy information. Furthermore, the plan creation unit 117 creates the simple operation plan based on the operation information and the component information included in the scenario information, for the device U for which the scenario information is set to be applied. Furthermore, the plan creation unit 117 creates an operation plan (hereinafter, also referred to as a "detailed operation plan") for a components related to the device U, based on the detailed setting acquired by the detailed setting acquisition unit 116.

The simple operation plan is a rotation plan for a component created based on the minimum required information about the device U. On the other hand, the detailed operation plan is a rotation plan for a component created based on multiple pieces of information unique to the device U, and is more accurate than the simple operation plan. In the present embodiment, the user can select freely the simple operation plan that can be easily and quickly created from an input of the minimum required information only or the detailed operation plan that features a high accuracy but requires an input of multiple pieces of information.

The input reception unit 12 receives instructions, information, settings, and the like input from the user to the operation plan creation device 10.

The output unit 13 outputs display data, such as an operation plan, to a display (output device) connected to the operation plan creation device 10. Note that the display is an example of the output device. The output device may be a printer, another computer terminal, or the like. The output unit 13 may output an operation plan and the like in a specific file format.

The communication unit 14 communicates with other devices. For example, the communication unit 14 transmits and receives information to and from the individual component information management system 20 over the network NW.

The storage unit 15 stores various information and the like acquired or created when each unit of the CPU 11 executes processing.

(Processing by Operation Plan Creation Device)

Figure 3:
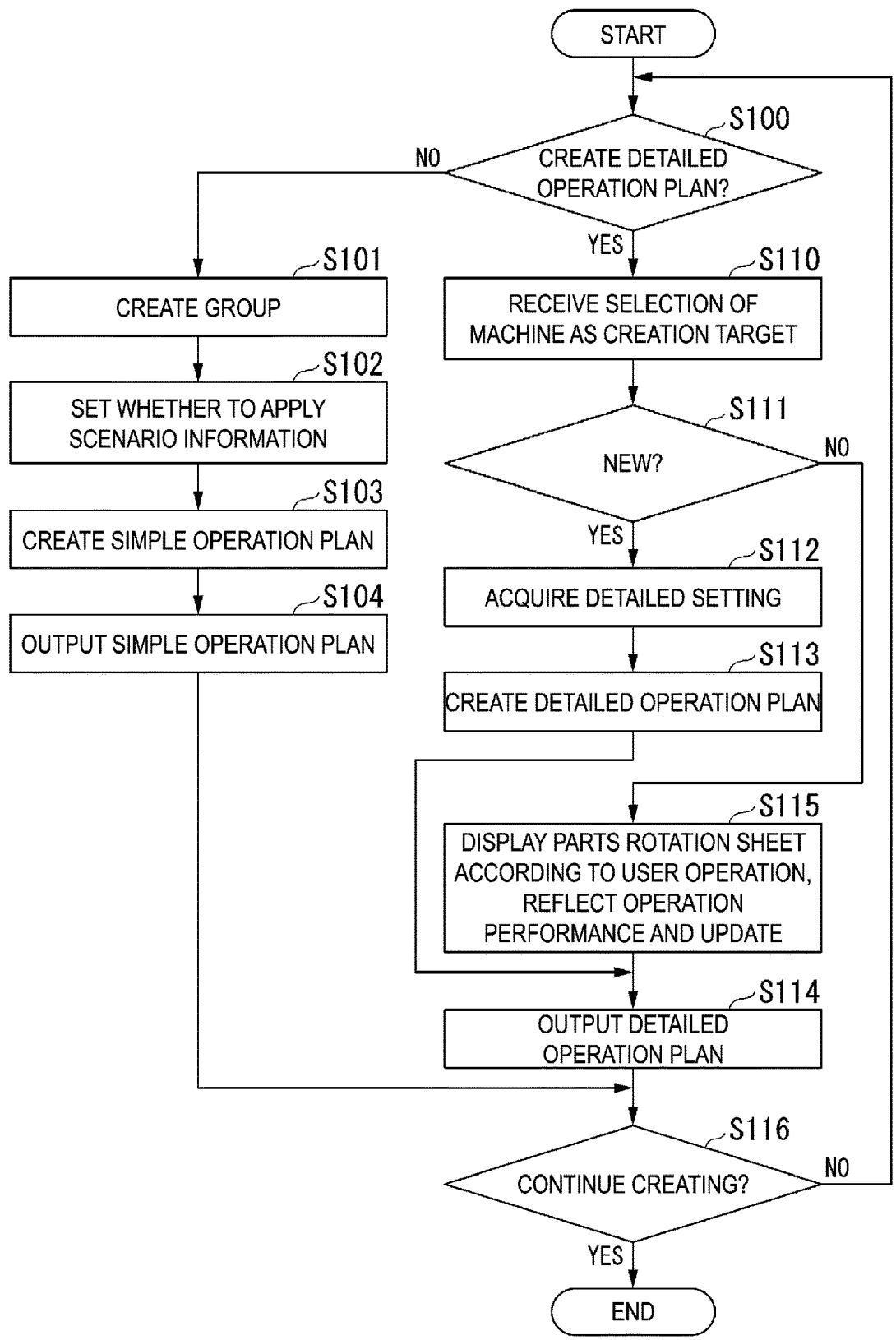
FIG. 3 is a first flowchart illustrating an example of processing executed by the operation plan creation device according to one embodiment of the present invention.

FIG. 3 is a first flowchart illustrating an example of processing executed by the operation plan creation device according to one embodiment of the present invention.

Figure 4:
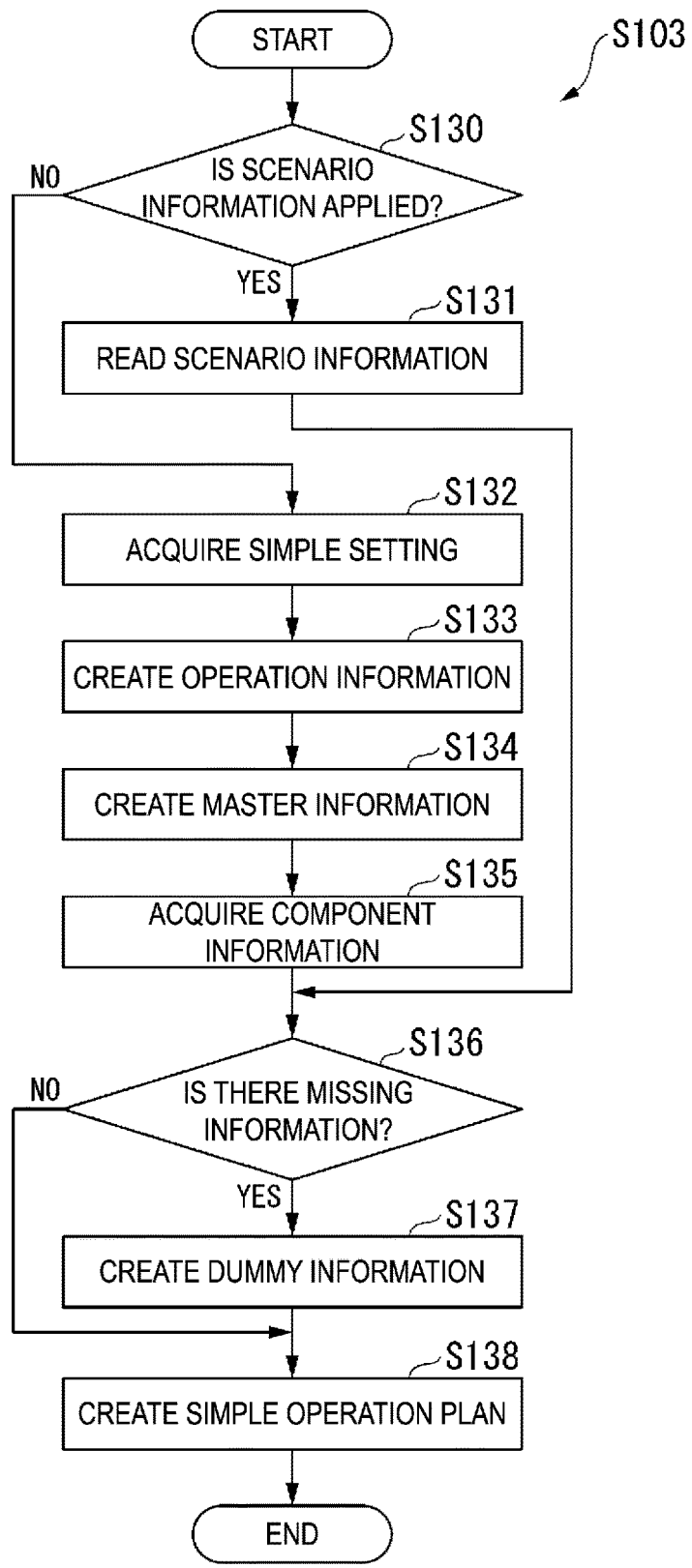
FIG. 4 is a second flowchart illustrating an example of processing executed by the operation plan creation device according to one embodiment of the present invention.

FIG. 4 is a second flowchart illustrating an example of processing executed by the operation plan creation device according to one embodiment of the present invention.

Hereinafter, a flow of processing by the operation plan creation device 10 will be described with reference to FIGS. 3 and 4.

The plan creation unit 117 of the operation plan creation device 10 according to the present embodiment first displays a selection screen D1 (FIG. 5), and receives a selection about whether to create the detailed operation plan from the user (step S100).

Figure 5:
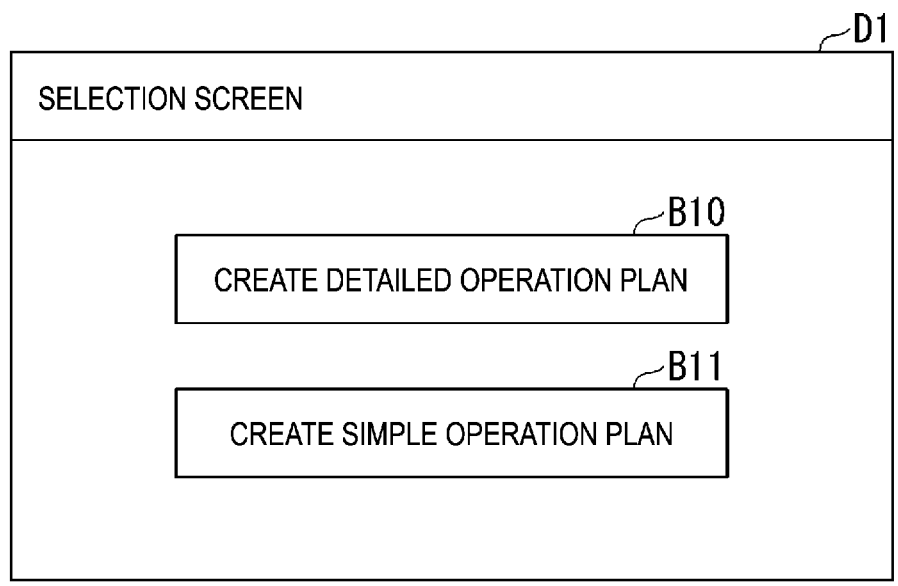
FIG. 5 is a diagram illustrating a function of the operation plan creation device according to one embodiment of the present invention.

FIG. 5 is a first diagram illustrating functions of the operation plan creation device according to one embodiment of the present invention.

As illustrated in FIG. 5, a detailed operation plan creation button B10 and a simple operation plan creation button B11 are displayed on the selection screen D1. When the input reception unit 12 receives an operation for selecting the detailed operation plan creation button B10 from the user (step S100: YES), the plan creation unit 117 starts a series of processes for creating the detailed operation plan. On the other hand, when the input reception unit 12 receives an operation for selecting the simple operation plan creation button B11 from the user (step S100: NO), the plan creation unit 117 starts a series of processes for creating the simple operation plan.

First of all, a flow of a series of processes performed by the plan creation unit 117 to create the simple operation plan will be described. When the simple operation plan creation button B11 is selected by the user (step S100: NO), the group creation unit 110 displays a group setting screen D2 (FIG. 6). Then, in accordance with the content of an input on the group setting screen D2 by the user, a group of machines that are targets of the creation of the simple operation plan is created (step S101).

FIG. 6 is a diagram illustrating a function of the group creation unit according to one embodiment of the present invention.

As illustrated in FIG. 6, the group setting screen D2 includes an operation region D20 for receiving an operation for searching for a machine and additionally registering the machine in a group, and an operation region D21 for displaying a list of machines registered in the group.

For example, on the operation region D20, a user can search for a desired machine by pressing a search button B20 after designating a condition including at least one of the name of a region/country where the machine is provided, the name of the customer managing the machine (customer name), the machine name, and a model of the device U used in the machine. In response to this, the group creation unit 110 searches for the machine satisfying the designated condition, and displays the search result in the operation region D20. The user can register the selected machine in the group by selecting the desired machine from the search result and pressing an add button B21.

Furthermore, a list of machines registered in the group (target list) is displayed in the operation region D21. By designating a condition including at least one of the region name, the country name, the customer name, and the machine name, and then pressing a search button B22, the user can only display the machines satisfying the condition in the target list among the machines registered in the group. The user can also sort the target list by a group number, the region name, the country name, the customer name, and the machine name.

The scenario information creation unit 115 determines whether to apply scenario information for each of the machines registered in the group, in accordance with the content of input on the group setting screen D2 by the user (step S102).

In the operation region D21 of the group setting screen D2, the user performs operations for selecting whether to apply scenario information for each of the machines registered in the group. When there are a plurality of pieces of scenario information created, the user can select any scenario information from the list of scenario information (not illustrated) and apply the scenario information to the machine, by pressing a scenario selection button B23. The user may apply one or a plurality of pieces of scenario information to a single machine. The user may apply one or a plurality of pieces of scenario information to a set of a plurality of machines.

When the user presses a save button B24 on the group setting screen D2, the group creation unit 110 creates a group including machines displayed in the operation region D21, and stores the group in the storage unit 15 (step S101). Furthermore, for each of the machines registered in the group, the scenario information creation unit 115 stores in the storage unit 15 the scenario information setting content (whether to apply the scenario information, and which scenario information is to be applied when the scenario information is set to be applied) (step S102).

When a group of users created in the past is stored in the storage unit 15 and there is no change in the setting content of the group and the scenario information, the user may perform an operation to use the group that has already been created. In this case, the group creation unit 110 and the scenario information creation unit 115 read the configuration contents of the existing group and scenario information from the storage unit 15 in response to the user operation, and steps S101 to S102 in FIG. 3 may be omitted.

Next, the plan creation unit 117 creates the simple operation plan for each of the devices U of the machines included in the created group (step S103). Details of processing for creating the simple operation plan will be described with reference to FIG. 4.

As illustrated in FIG. 4, the plan creation unit 117 determines whether existing scenario information is applied to a machine provided with the device U for which the simple operation plan is created (step S130).

When the scenario information is not applied (step S130: NO), the units of the operation plan creation device 10 execute processing to acquire various pieces of information for creating the simple operation plan for the device U.

Specifically, for the device U to which the scenario information is not applied, the simple setting acquisition unit 111 displays a simple setting screen D3 (FIG. 7), and requests the user for the input of the simple setting. Then, the simple setting acquisition unit 111 acquires the simple setting input by the user via the input reception unit 12 (step S132).

FIG. 7 is a diagram illustrating a function of the simple setting acquisition unit according to one embodiment of the present invention.

As illustrated in FIG. 7, the simple setting acquisition unit 111 acquires a simple setting, input by the user on the simple setting screen D3, including: a periodic inspection pattern; an operation start date; a periodic inspection interval; a number of days consumed per operation; and a periodic inspection count.

FIG. 8 is a diagram illustrating an example of the periodic inspection pattern according to one embodiment of the present invention.

The periodic inspection pattern is information in which the type of inspection and order of inspections performed as the periodic inspection performed on the device U for a plurality of times are defined in advance. Not all the components of the device U are necessarily replaced during the periodic inspection. For example, components that wear out in a short period of time may be replaced in each inspection, and components that are hardly worn, even when used for a long period of time, may be replaced once in every several inspections. In the present embodiment, as illustrated in FIG. 8, the storage unit 15 stores in advance periodic inspection pattern information T1 defining the periodic inspection patterns designating the inspection types indicating the combination of components to be replaced and the implementation order of the inspection types. The simple setting acquisition unit 111 causes the user to select any of the periodic inspection patterns defined by the periodic inspection pattern information T1, on the simple setting screen D3. Furthermore, the simple setting acquisition unit 111 may receive a new inspection type and a periodic inspection pattern input by the user and add them to the periodic inspection pattern information T1.

In the example of FIG. 8, in the periodic inspection pattern information T1, inspection types different from each other in contents of the components to be replaced and the period (number of days) required for the inspection are defined in advance. The inspection types include: a small scale inspection ("inspection type C") in which only components A01 and B01 that are consumed in a short period of time are replaced; a medium scale inspection ("inspection type T") in which a components C01 is also replaced in addition to the components A01 and B01; a large scale inspection ("inspection type M") in which all the components A01, B01, C01, and D01 are replaced; and the like. Furthermore, the periodic inspection pattern defining the implementation order of the plurality of inspection types is also defined in advance. For example, a pattern number 1 defines that a periodic inspection is carried out with the inspection type C, the inspection type T, the inspection type C, and the inspection type M implemented in this order. On the simple setting screen D3, the user can select any of the predefined inspection patterns according to the geographic conditions (installed region and country), customer request, model, and the like of the device U.

The operation start date indicates the date when the device U (or machine) starts to be operated. For example, in a case where a new device U is introduced into a certain machine, an operation start date of this new device U is input.

The periodic inspection interval indicates the operation time of the device U until a periodic inspection is carried out.

The number of days consumed per operation indicates the number of operation days between the start (initial start or restart after the periodic inspection) and stop of the device U.

The periodic inspection count indicates the number of times the periodic inspection is performed on the device U.

Next, the operation information creation unit 112 generates operation information in which the periodic inspection period of the device U and the components to be replaced during the periodic inspection are scheduled based on the simple setting acquired by the simple setting acquisition unit 111 (step S133), and displays the operation information on an operation information display screen D4 (FIG. 9).

FIG. 9 is a diagram illustrating a function of the operation information creation unit according to one embodiment of the present invention. For example, as illustrated in FIG. 9, the operation information according to the present embodiment is provided as a list in which the operation periods of the device U are listed in order of time. The periodic inspection is assumed to be performed during each operation period. ID is information identifying each of the operation periods of the device U. Type is information indicating the state of the device U, and is information indicating that the device U is in the "operating" state is input in the example illustrated in FIG. 9.

Installation work and removal work are information indicating which of the inspection types the corresponding work is to be performed, in the periodic inspection carried out in a period from the operation stop date to an operation start date of each operation. The operation information creation unit 112 determines the contents of the installation work and the removal work based on the periodic inspection pattern designated in the simple setting. In the example illustrated in FIG. 7, a pattern 1 is set as the periodic inspection pattern, and thus the operation information creation unit 112 sets the inspection type C for the removal work (the removal work with ID: 000) and the installation work (the installation work with ID: 001) during the first periodic inspection. Similarly, the inspection type T is set for the removal work (removal work with ID: 001) and installation work (installation work with ID: 002) during the second periodic inspection, the inspection type C is set for the removal work (removal work with ID: 002) and installation work (installation work with ID: 003) during the third periodic inspection, and inspection type M is set for the removal work (removal work with ID: 003) and installation work (installation work with ID: 004) during the fourth periodic inspection.

The start point and the end point are information indicating the operation start date and the operation stop date of each operation of the device U. The operation information creation unit 112 determines the operation start date and the operation stop date for each operation, based on the periodic inspection interval included in the simple setting, the operation period (number of days) of each operation based on the number of days consumed per operation, and the inspection period (information included in the periodic inspection pattern information T1 in FIG. 8) corresponding to the inspection type of each periodic inspection.

Component replaced during installation is information indicating the type of the component that is a target of replacement (installation and removal) during each periodic inspection. Based on the periodic inspection pattern information T1 in FIG. 8, the operation information creation unit 112 determines the replacement component type corresponding to the inspection type for each periodic inspection.

Next, the component information acquisition unit 113 creates master information (lifespan master T2) defining the lifespan of each of the components used in the device U (step S134).

FIG. 10 is a schematic diagram illustrating an example of master information according to one embodiment of the present invention.

As illustrated in FIG. 10, the lifespan master T2 includes a component code with which a component is identifiable and a design life. The design life is, for example, a lifespan of each component, defined in advance by a manufacturer of the component.

Next, the component information acquisition unit 113 receives use history information T3 on a component from the individual component information management system 20 via the communication unit 14, and acquires the lifespan information and stock quantity information (step S135).

FIG. 11 is a schematic diagram illustrating an example of use history information according to one embodiment of the present invention.

As illustrated in FIG. 11, in the use history information T3, the quantity and the consumption time of each of a component used (mounted) in the device U and a spare component scheduled to be used are recorded, for a machine (machine PL01 for example) provided with the device U. The component information acquisition unit 113 acquires, based on the use history information T3, lifespan information, indicating the remaining lifespan, and the stock quantity information about each component. The lifespan information is expressed by a value obtained by subtracting the consumption time from the design life of the component (FIG. 10) for example. In the following description, the lifespan information and the stock quantity information are also collectively referred to as "component information".

When the scenario information is applied (step S130: YES), the plan creation unit 117 reads the set scenario information from the storage unit 15 (step S131). The scenario information includes the operation information and the component information that have already been created.

Next, the dummy information creation unit 114 determines whether the operation information and the component information read from the scenario information or the operation information and the component information created and acquired in steps S132 to S135 described above includes missing information indicating the lack of information (step S136).

For example, it is assumed that the component information about one device U is incomplete. Generally, the components used in the device U are stored in the individual component information management system 20 as the use history information T3 (FIG. 11) in which the consumption time and the stock quantity are associated with the component code. However, because thousands of components may be used in the device U, some information might fail to be registered. For example, information about a component currently used in the device U might fail to be included in the use history information T3. In such a case, the dummy information creation unit 114 determines that there is missing information in the component information (step S136: YES), and creates dummy information to be used instead of the missing information (step S137). For example, as described above, when a component being used in the device U is not registered in the use history information T3, the dummy information creation unit 114 creates dummy information indicating the component code, the consumption time, and the stock quantity of the component, based on the past use history information about the device U and the like.

On the other hand, when the operation information and the component information are complete (step S136: NO), the dummy information creation unit 114 omits the step S137 and proceeds to the next step S138.

Next, the plan creation unit 117 creates a simple operation plan based on the operation information and the component information read from the scenario information, or the operation information and the component information created and acquired in steps S132 to S135 (step S138). When the dummy information has been generated by the dummy information creation unit 114, the plan creation unit 117 creates the simple operation plan with this dummy information compensating for the missing information of the operation information and the component information.

Upon completing the creation of the simple operation plan, the plan creation unit 117 returns to the flowchart of FIG. 3, and outputs a created simple operation plan T4 (FIG. 12) via the output unit 13 (step S104). Furthermore, the plan creation unit 117 stores data on the created simple operation plan T4 and the operation information and the component information used for creating the simple operation plan, in the storage unit 15.

FIG. 12 is a diagram illustrating an example of a simple operation plan according to one embodiment of the present invention.

For example, as illustrated in FIG. 12, the plan creation unit 117 outputs the simple operation plan T4 expressing the monthly quantity of each component code attached to the device U during the periodic inspection. In the simple operation plan T4, the scenario information indicates information (ID) with which the scenario information applied when the simple operation plan is created is identifiable. Category is information indicating whether a component attached to the device U during the periodic inspection is a new component or a repaired component. In the example of FIG. 12, it can be seen that 12 new components and 12 repaired components identified by the component code "AAA01" are to be attached to the device U in "machine 08" during the periodic inspection carried out in May 2018. The user can predict the demand of the component by referring to such a monthly required quantity of the component, for ordering, manufacturing, or the like of the component.

Now, a flow of a series of processes performed by the plan creation unit 117 to create the detailed operation plan will be described. When the user selects the detailed operation plan creation button B10 on the selection screen D1 (FIG. 5) (step S100: YES), the plan creation unit 117 receives the selection of the machine that is the target of the creation (step S110). For example, the plan creation unit 117 displays a screen for inputting the machine name or a machine list to receive designation (selection) of a desired machine name from the user.

Next, the plan creation unit 117 determines whether to newly create a detailed operation plan for the selected machine (step S111). Specifically, the plan creation unit 117 determines whether the detailed operation plan of the machine is stored in the storage unit 15.

When the detailed operation plan of the machine is not stored in the storage unit 15, that is, when the plan is to be newly created (step S111: YES), the detailed setting acquisition unit 116 displays a creation start screen D5 (FIG. 13). Then, the detailed setting acquisition unit acquires the detailed setting input by the user on the creation start screen D5 (step S112).

FIG. 13 is a diagram illustrating a function of the detailed setting acquisition unit according to one embodiment of the present invention.

FIG. 14 is a diagram illustrating an example of detailed setting according to one embodiment of the present invention.

As illustrated in FIG. 13, the creation start screen D5 includes fields for inputting the machine name select by the user as well as the detailed setting of the machine. For example, as illustrated in FIG. 14, the detailed setting includes the number of devices, number of plan years, machine name, model, delivered component, operation start year, operation start month, periodic inspection interval, component lifespan, replacement pattern, delivered component name, delivered component ID, constituent component, and number of constituent components.

The number of devices is the unit number of devices U (four, for example) operated in the selected machine. The number of plan years is the number of years (13, for example) for which parts rotation for components mounted in the corresponding device U, namely, the creation of a detailed operation plan, is to be carried out. A machine name is the name (PL01, for example) of the machine in which the corresponding device U is operated. A model is the model of the corresponding device U. A delivered component is a component (component type A01, for example) for which parts rotation is carried out. An operation start year is the year (2010, for example) in which operation of the corresponding device U is started. An operation start month is the month (October, for example) in which operation of the corresponding device U is started. A periodic inspection interval is hours (18,000, for example) representing the interval between periodic inspections of components mounted in the corresponding device U. A component lifespan is the cumulative operation hours at which it is necessary for the components mounted in the corresponding device U to be disposed. A replacement pattern is the number of intervals (one, for example) during which the components mounted in the corresponding device U are to be replaced. A delivered component name and a delivered component ID are the same as the aforementioned delivered component. A constituent component is the name (such as a component code AAA01, for example) of a component configured of a plurality of elements. The constituent component is information about a component that is a candidate of allocation to the device U. The term candidate indicates that even when a constituent component is included in the setting data, the constituent component cannot be allocated under a situation where it cannot be allocated. The number of constituent components is the quantity (16, 2, 2, for example) of a constituent component.

Next, the plan creation unit 117 creates a detailed operation plan based on the detailed setting acquired by the detailed setting acquisition unit 116 (step S113).

Upon completing the creation of the detailed operation plan, the plan creation unit 117 outputs a created detailed operation plan T6 (FIG. 15) as a parts rotation screen D6 via the output unit 13 (step S114). Furthermore, the plan creation unit 117 stores data on the created detailed operation plan T6 and the detailed information used for creating the detailed operation plan, in the storage unit 15.

Figure 15:
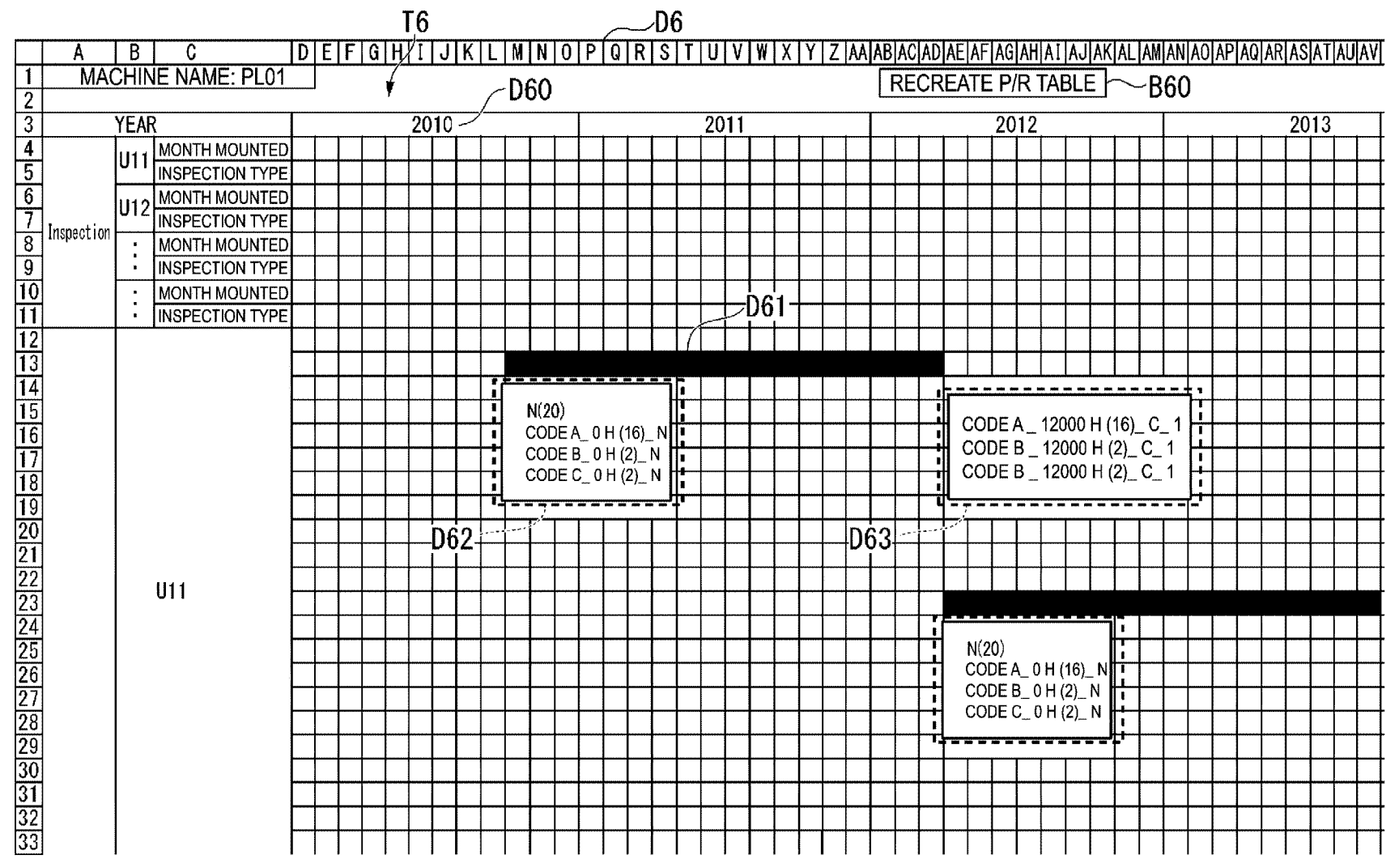

FIG. 15 is a diagram illustrating an example of a detailed operation plan according to one embodiment of the present invention.

As illustrated in FIG. 15, data corresponding to a machine name (PL01) and year information D60, which corresponds to the operation start year, is displayed in the parts rotation screen D6. The parts rotation screen D6 displays, for each of the devices U (U11, U12, . . . ) to operate in the corresponding machine PL01, data corresponding to each of a graph D61 indicating the operation period of a component, configuration information D62 on the component to be mounted to the device, and configuration information D63 on a component to be removed during the periodic inspection.

When the detailed operation plan of the machine selected in step S110 is stored in the storage unit 15, that is, when the detailed operation plan is not to be newly created (step S111: NO), the plan creation unit 117 reads the detailed operation plan T6 from the storage unit 15, and displays the plan on the parts rotation screen D6. As illustrated in FIG. 15, a button B60 for recreating the detailed operation plan T6 is displayed on the parts rotation screen D6. When the user inputs information about the year and the month when the periodic inspection was actually carried out in the detailed operation plan T6 and presses the button B60, the plan creation unit 117 updates the contents of the operation period graph D61, the configuration information D62 on the component to be mounted, and the configuration information D63 on the component to be removed based on the information thus input (step S115). As a result, the plan creation unit 117 can modify the detailed operation plan T6 in accordance with actual operation performance, to increase the accuracy of the plan.

Next, when the creation and output of the simple operation plan or the detailed operation plan are completed, the plan creation unit 117 determines whether to continue the processing to create another operation plan (step S116). For example, the plan creation unit 117 displays a display screen for confirming whether to continue the creation processing, and determines whether an operation for continuing the creation processing is received from the user. When the operation for continuing the creation processing is received (step S116: YES), the plan creation unit 117 returns to step S100. When an operation for not continuing the creation processing is received (step S116: NO), the plan creation unit 117 terminates the processing illustrated in FIG. 3.

Note that the flows of the processing illustrated in FIGS. 3 and 4 are examples, and the order of steps may be changed as long as the creation of the simple operation plan and the detailed operation plan is not affected.

Figure 16:
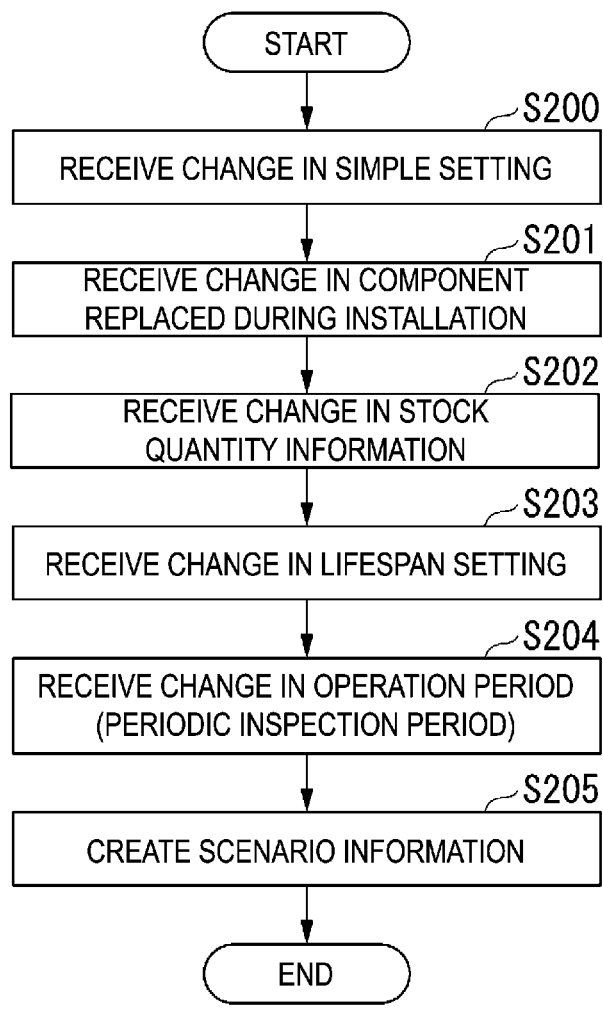
FIG. 16 is a third flowchart illustrating an example of processing executed by the operation plan creation device according to one embodiment of the present invention.

FIG. 16 is a third flowchart illustrating an example of processing executed by the operation plan creation device according to one embodiment of the present invention.

Upon receiving a change in the operation information and the component information about the device U in the operation information display screen D4 (FIG. 9), the scenario information creation unit 115 creates scenario information including operation information and component information after the change for example. As illustrated in FIG. 9, the operation information display screen D4 displays a simple setting change button B40, a component replaced during installation change button B41, a local stock change button B42, a lifespan information change button B43, an add row button B44, and a delete row button B45, as well as a save button B46 for storing various types of modified information as scenario information.

An example of processing executed by the scenario information creation unit 115 to create the scenario information via the operation information display screen D4 will be described below with reference to FIG. 16.

The user is assumed to have pressed the simple setting change button B40 in the operation information display screen D4. Then, the scenario information creation unit 115 displays the simple setting screen D3 (FIG. 7) to receive a change in the simple setting by the user (step S200). For example, when the user changes the periodic inspection pattern, the scenario information creation unit 115 uses the function of the operation information creation unit 112 to change the operation information in accordance with the content of the change.

The user is assumed to have pressed the component replaced during installation change button B41 in the operation information display screen D4. Then, the scenario information creation unit 115 displays a change screen D7 (FIG. 17) to receive a change in the component replaced during installation (step S201).

Figure 17:
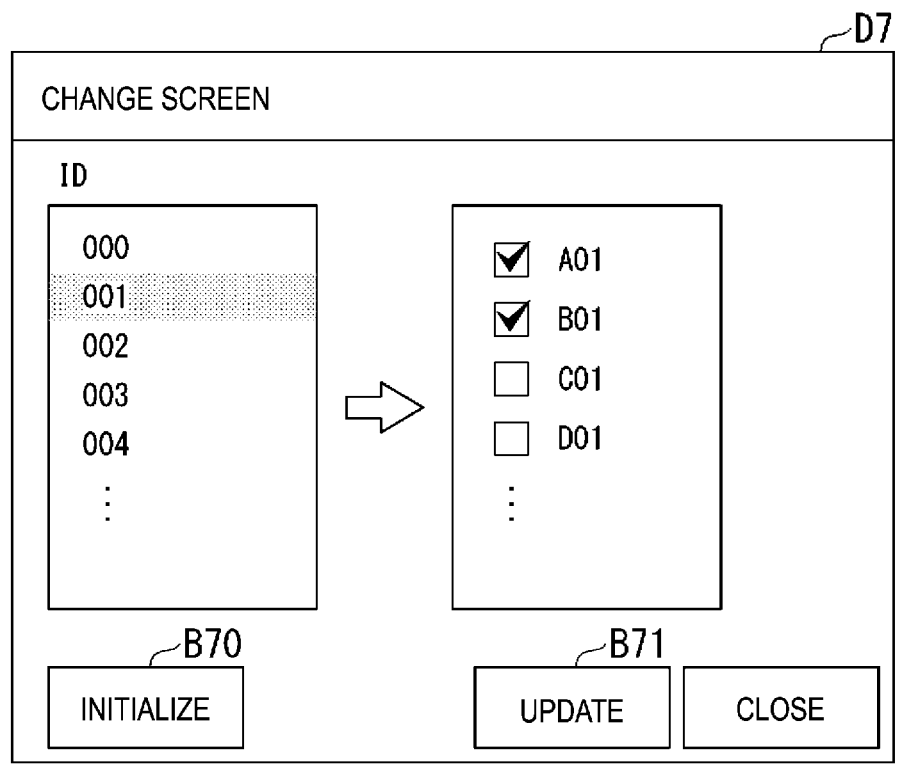
FIG. 17 is a first diagram illustrating a function of a scenario information creation unit according to one embodiment of the present invention.

FIG. 17 is a first diagram illustrating a function of the scenario information creation unit according to one embodiment of the present invention.

As illustrated in FIG. 17, in the change screen D7, the user can select and change the type of component to be installed during the installation work for each of the operation periods (IDs) included in the operation information (FIG. 9). For example, it is assumed that a new component or a spare component is scheduled to be installed to replace the component types A01, B01, and C01 in the installation work (inspection type T (FIG. 8)) with ID001 as illustrated in FIG. 9. Under this condition, upon deciding that the component type C01 needs not to be replaced during this ID001, the user performs an operation to delete C01 from the component types pertaining to the ID001 (cancel the selection), and presses an update button B71 in the change screen D7 (FIG. 17). Then, the scenario information creation unit 115 changes the information (component replaced during installation) on the ID001 in the operation information.

When the user presses the local stock change button B42 in the operation information display screen D4, the scenario information creation unit 115 displays a local stock change screen D8 (FIG. 18) to receive a change in the stock quantity information about the component (step S202).

FIG. 18 is a second diagram illustrating a function of the scenario information creation unit according to one embodiment of the present invention.

As illustrated in FIG. 18, in the local stock change screen D8, the stock quantity of each component code in a machine in which the device U is installed can be changed. For example, the user manually inputs the stock quantity of each of the components, and presses an update button B80, for example, when the update of the use history information T3 (FIG. 11) stored in the individual component information management system 20 is delayed or in the other like cases. Then, the scenario information creation unit 115 changes the stock quantity information included in the component information about the device U to a value input on the local stock change screen D8.

When the user presses the lifespan information change button B43 in the operation information display screen D4, the scenario information creation unit 115 displays a lifespan setting screen D9 (FIG. 19) to receive a change in the lifespan information about the component (step S203).

FIG. 19 is a third diagram illustrating a function of the scenario information creation unit according to one embodiment of the present invention.

As illustrated in FIG. 19, in the lifespan setting screen D9, the design life of each component can be changed to a changed lifespan. Further, for the same component, the lifespan can be changed from a certain time point. In this case, an end point of application of the lifespan before the change and a start point of application of the lifespan after the change can each be set. Various application start point settings can be set, such as year (for example, application starts from 2012), month (for example, application starts from October 2012), or a certain inspection type of a certain year (for example, application starts from the inspection type C in year 2012). The same applies to the application end point. For example, the lifespan of a component AAA01 is assumed to differ among the seasons or the like. In this case, the user changes the lifespan of the component AAA01 to the changed lifespan, sets the application start point and application end point, and presses the update B90 button B90. Then, the scenario information creation unit 115 changes the lifespan information included in the component information about the device U to a value input on the lifespan setting screen D9.

When the user presses the add row button B44 or the delete row button B45 in the operation information display screen D4, the scenario information creation unit 115 receives a change to add a new operation period (or a periodic inspection period) or delete an existing operation period to or from the operation information (step S204). For example, the user selects any row in the operation information and presses the delete row button B45. Then, the scenario information creation unit 115 deletes the selected row from the operation information. The user also selects any row in the operation information and presses the add row button B44. Then, the scenario information creation unit 115 inserts a row indicating a new operation period into the selected row. The user inputs information such as start point and an end point for the new operation period. With such an operation, the user can increase or reduce the number of operation periods (periodic inspections).

In step S204, the scenario information creation unit 115 may receive a change in various types of information (start point, end point, installation work, and removal work) included in the operation information about the operation information display screen D4.

When the information about at least part of the operation information and the component information is changed and the save button B46 on the operation information display screen D4 is pressed in steps S200 to S204 described above, the scenario information creation unit 115 creates the scenario information including the operation information and the component information changed, and stores the changed information in the storage unit 15 (step S205).

(Hardware Configuration of Operation Plan Creation Device)

Figure 20:
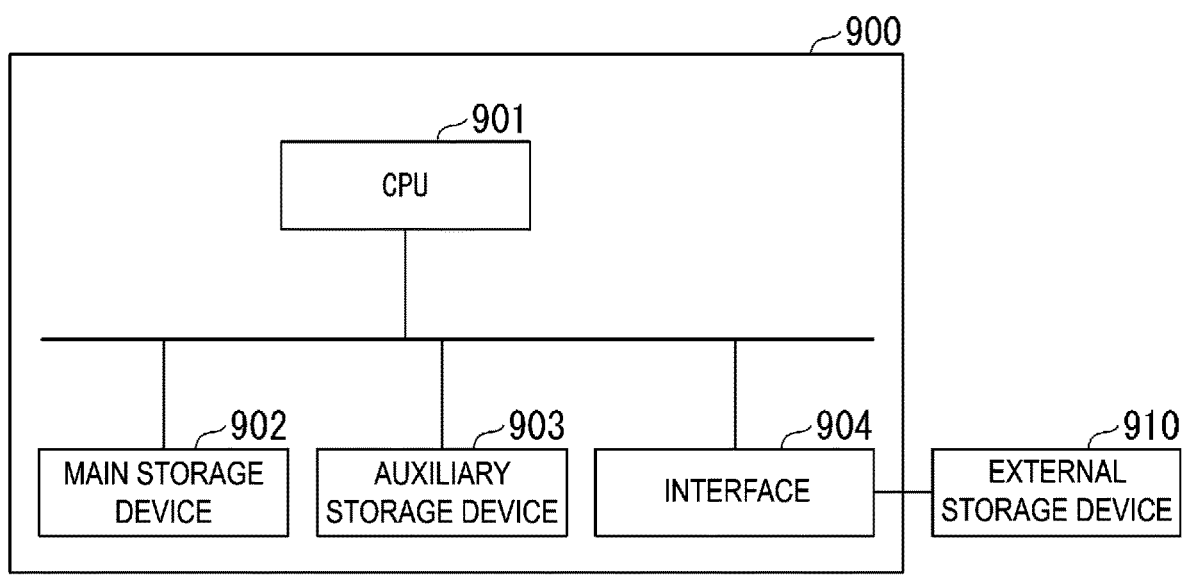
FIG. 20 is a diagram illustrating an example of a hardware configuration of the operation plan creation device according to one embodiment of the present invention.

FIG. 20 is a diagram illustrating an example of a hardware configuration of the operation plan creation device according to one embodiment of the present invention.

Hereinafter, an example of a hardware configuration of the operation plan creation device 10 described above will be described with reference to FIG. 20.

As illustrated in FIG. 20, a computer 900 includes a CPU 901, a main storage device 902, an auxiliary storage device 903, and an interface 904.

The operation plan creation device 10 described above is installed in the computer 900. Further, the operations of the respective processing units described above are stored in a form of a program in the auxiliary storage device 903. The CPU 901 (CPU 11) reads the program from the auxiliary storage device 903, deploys the program to the main storage device 902, and executes the above-described processing in compliance with the program. Further, the CPU 901 secures storage areas used by the operation plan creation device 10 for various types of processing in the main storage device 902 in accordance with the program. The CPU 901 secures a storage area (storage unit 15) for storing data during processing in the auxiliary storage device 903 in compliance with the program.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The auxiliary storage device 903 may be an internal medium directly connected to a bus of the computer 900, or may be an external medium connected to the computer 900 via the interface 904 or a communication line. Further, when this program is distributed to the computer 900 through a communication line, the computer 900 receiving the distribution may develop the program to the main storage device 902, and may execute the above-mentioned processing. In at least one of the embodiments, the auxiliary storage device 903 is a non-temporary tangible storage medium.

Further, the program may achieve some of the functions described above. In addition, the program may achieve the functions described above in combination with other programs already stored in the auxiliary storage device 903, that is, may be differential files (differential programs).

(Operational Effects)

As described above, the operation plan creation device 10 according to the present embodiment is an operation plan creation device configured to create an operation plan for a plurality of components mounted to a device U, the operation plan creation device including: a simple setting acquisition unit 111 configured to acquire a simple setting including number of inspections on the device U, information with which an inspection interval is identifiable, and an inspection pattern with which a component to be replaced in an inspection is defined in advance; an operation information creation unit 112 configured to create operation information including an inspection period and a replacement scheduled component of the device U based on the acquired simple setting; a component information acquisition unit 113 configured to acquire component information including lifespan information and stock quantity information about each of the plurality of components currently used in or to be used in the device U, based on use history information T3 on each of the plurality of components; a dummy information creation unit 114 configured to create, when the acquired component information includes missing information, dummy information to be used instead of the missing information; and a plan creation unit 117 configured to create the operation plan (simple operation plan) for the components related to the device U based on the operation information and the component information or the dummy information.

With the known technique, the user is required go through an extremely labor and time consuming process of inputting a large number of condition settings, information, and the like (such as, for example, the use history information illustrated in FIG. 11 and the detailed setting illustrated in FIG. 14) unique to the device in advance, to create an operation plan for a component. Furthermore, as described above, because thousands of components are used in the device U, for example, some information might fail to be registered in the use history information T3. Thus with the known technique, the operation plan cannot be created if a part of the condition settings and the information is missing.

On the other hand, with the operation plan creation device 10 according to the present embodiment, the operation information about the device U can be created by inputting the simple setting only, and when the component information is missing, the simple operation plan can be created with the dummy information compensating for the missing information. Thus, the user can easily and swiftly create the operation plan for a component by only performing a simple operation.

Furthermore, it might take a long period of time (several months for example) to manufacture a component. Thus, when the creation of the operation plan is delayed, the prediction accuracy of the demand of the component is compromised. As a result, the manufacturing and delivery of the components may fail to be completed at the time when the components are actually required (when a periodic inspection is carried out). In view of this, the operation plan creation device 10 according to the present embodiment can easily and swiftly create an operation plan for a component as described above, to thereby enable the manufacturer of the component to predict the demand of the component and manufacture the component with an enough amount of time (to manage appropriate stock levels).

The operation plan creation device 10 further includes the scenario information creation unit 115 that upon receiving a change in the operation information and the component information about one of the plurality of devices U, creates scenario information including operation information and component information after the change. The plan creation unit 117 creates the simple operation plan based on the operation information and the component information included in the scenario information for the one device.

With such a configuration, the operation plan creation device 10 can create a more accurate operation plan by using scenario information including the operation information and the component information changed in accordance with an operation state (installation environment, continuous operation time, and the like) of the device U.

The scenario information creation unit 115 determines whether to apply the scenario information for each of the plurality of devices U, and for a device U to which the scenario information is determined to be applied, the plan creation unit 117 creates the simple operation plan based on the operation information and the component information included in the scenario information.

With such a configuration, for example, the operation plan creation device 10 can apply the same scenario information to a plurality of devices U under similar operation states, to create the simple operation plan. Thus, the operation plan creation device 10 can create a highly accurate operation plan for a device U to which the scenario information is applied, while reducing labor for individually creating the scenario information for each of the plurality of devices U.

The scenario information creation unit 115 receives a change to add or delete the inspection period and the replacement scheduled component.

With such a configuration, the operation plan creation device 10 can increase or decrease the number of periodic inspections and the replacement scheduled components, depending on the operation state and the like of the device U. Thus, the operation plan creation device 10 can create a more accurate operation plan.

The scenario information creation unit 115 receives a change in the predefined inspection pattern.

With such a configuration, the operation plan creation device 10 can change the inspection pattern, depending on the operation state and the like of the device U. Thus, the operation plan creation device can create a more accurate operation plan.

The dummy information creation unit 114 creates the dummy information about the lifespan information based on the design life of each of the plurality of components.

With this configuration, the operation plan creation device 10 can reduce the labor of the user for inputting the lifespan information about the component.

Although embodiments of the present invention have been described above in detail, the present invention is not limited to those embodiments, and some design changes and the like may also be made to the present invention without departing from the technical concept of the present invention.

For example, in the embodiment described above, an example is described in which the plan creation unit 117 creates the simple operation plan T4 (FIG. 12) in which the monthly quantity of each of the component codes attached to the device U during the periodic inspection. However, this should not be construed in a limiting sense. In other embodiments, as illustrated in FIG. 15 for example, the plan creation unit 117 may create a simple operation plan in which the time at which the components are attached and removed is graphically indicated.

INDUSTRIAL APPLICABILITY

With the operation plan creation device, the operation plan creation method, and the program according to the present invention, an operation plan for a component can be easily and swiftly created.

REFERENCE SIGNS LIST

1 Operation plan creation system
10 Operation plan creation device
11 CPU
110 Group creation unit
111 Simple setting acquisition unit
112 Operation information creation unit
113 Component information acquisition unit
114 Dummy information creation unit
115 Scenario information creation unit
116 Detailed setting acquisition unit
117 Plan creation unit
12 Input reception unit
13 Output unit
14 Communication unit
15 Storage unit
20 Individual component information management system

The invention claimed is:

1. An operation plan creation device configured to create an operation plan for a plurality of components mounted to a device, the operation plan creation device comprising a processor configured to perform:

acquiring a simple setting including number of inspections on the device, information with which an inspection interval is identifiable, and an inspection pattern with which a component to be replaced in an inspection is defined in advance;

creating operation information including an inspection period and a replacement scheduled component of the device based on the acquired simple setting;

acquiring, from use history information recording quantity and a consumed time of each of the plurality of components, component information including lifespan information which is a value obtained by subtracting the consumed time from a design life and stock quantity information about each of the plurality of components currently used in or to be used in the device;

creating, when the acquired component information includes missing information of a first component among the plurality of components currently used in or to be used in the device, dummy information to be used instead of the missing information, wherein the dummy information including lifespan information and stock quantity information of the first component created from past use history information of the first component at which the first component has been used in the device in the past; and creating the operation plan for the components related to the device based on the operation information, the component information, and the dummy information.

2. The operation plan creation device according to claim 1, wherein the processor is further configured to perform:

creating scenario information including changed operation information and component information upon receiving a change in the operation information and the component information related to one of a plurality of the devices, and creating the operation plan based on the operation information and the component information included in the scenario information for the one device.

3. The operation plan creation device according to claim 2, wherein the processor is configured to perform:

determining whether to apply the scenario information for each of the plurality of devices, and for a device to which the scenario information is determined to be applied, creating the operation plan based on the operation information and the component information included in the scenario information.

4. The operation plan creation device according to claim 2, wherein the processor is configured to receive a change to add or delete the inspection period and the replacement scheduled component.

5. The operation plan creation device according to claim 2, wherein the processor is configured to receive a change in the inspection pattern defined in advance.

6. The operation plan creation device according to claim 1, wherein the processor is configured to create dummy information about the lifespan information based on a design life of each of the first component instead of the past use history information of the first component.

7. An operation plan creation method of creating an operation plan for a plurality of components mounted to a device, the method comprising:

acquiring a simple setting including number of inspections on the device, information with which an inspection interval is identifiable, and an inspection pattern with which a component to be replaced in an inspection is defined in advance;

creating operation information including an inspection period and a replacement scheduled component of the device based on the acquired simple setting;

acquiring, from use history information recording quantity and a consumed time of each of the plurality of components, component information including lifespan information which is a value obtained by subtracting the consumed time from a design life and stock quantity information about each of the plurality of components currently used in or to be used in the device;

creating, when the acquired component information includes missing information of a first component among the plurality of components currently used in or to be used in the device, dummy information to be used instead of the missing information, wherein the dummy information including lifespan information and stock quantity information of the first component created from past use history information of the first component at which the first component has been used in the device in the past; and creating the operation plan for the components related to the device based on the operation information, the component information, and the dummy information.

8. A non-transitory computer readable medium recording a program of a computer of an operation plan creation device configured to create an operation plan for a plurality of components mounted to a device function, the program causing the computer to execute:

acquiring a simple setting including number of inspections on the device, information with which an inspection interval is identifiable, and an inspection pattern with which a component to be replaced in an inspection is defined in advance;

creating operation information including an inspection period and a replacement scheduled component of the device based on the acquired simple setting;

acquiring, from use history information recording quantity and a consumed time of each of the plurality of components, component information including lifespan information which is a value obtained by subtracting the consumed time from a design life and stock quantity information about each of the plurality of components currently used in or to be used in the device, based on use history information about each of the plurality of components;

creating, when the acquired component information includes missing information of a first component among the plurality of components currently used in or to be used in the device, dummy information to be used instead of the missing information, wherein the dummy information including lifespan information and stock quantity information of the first component created from past use history information of the first component at which the first component has been used in the device in the past; and creating the operation plan for the components related to the device based on the operation information, the component information, and the dummy information.

\* \* \* \* \*